(12) United States Patent
Kaimal et al.

(10) Patent No.: US 11,170,336 B2
(45) Date of Patent: Nov. 9, 2021

(54) SYSTEMS AND METHODS SUPERVISOR WHISPER COACHING PRIORITY RECOMMENDATION ENGINE FOR CONTACT CENTERS

(71) Applicant: Cisco Technology, Inc., San Jose, CA (US)

(72) Inventors: Sajith Gopal Kaimal, Stow, MA (US); Srinivasa Subramanyam Pulugurtha, Nashua, NH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 189 days.

(21) Appl. No.: 16/440,763

(22) Filed: Jun. 13, 2019

(65) Prior Publication Data

US 2020/0394590 A1 Dec. 17, 2020

(51) Int. Cl.
*G06Q 10/06* (2012.01)
*H04M 3/51* (2006.01)
*G06Q 30/02* (2012.01)
*G06N 20/00* (2019.01)

(52) U.S. Cl.
CPC ....... *G06Q 10/06398* (2013.01); *G06N 20/00* (2019.01); *G06Q 30/0281* (2013.01); *H04M 3/5175* (2013.01)

(58) Field of Classification Search
USPC .......................................................... 70/7
See application file for complete search history.

(56) References Cited

U.S. PATENT DOCUMENTS

| | | | |
|---|---|---|---|
| 8,396,205 B1 | 3/2013 | Lowry et al. | |
| 8,675,860 B2 | 3/2014 | Eicholz et al. | |
| 9,521,258 B2 | 12/2016 | Ripa et al. | |
| 9,674,357 B1 | 6/2017 | Pycko et al. | |
| 2007/0198330 A1* | 8/2007 | Korenblit | G06Q 10/06393 705/7.42 |
| 2014/0140497 A1* | 5/2014 | Ripa | H04M 3/5133 379/265.06 |
| 2019/0237083 A1* | 8/2019 | Allen | G09B 5/00 |

OTHER PUBLICATIONS

Loizos Michael, Machine Coaching, 2019, Open University of Cyprus & Research Center on Interactive Media, Smart Systems, and Emerging Technologies (Year: 2019).*

* cited by examiner

*Primary Examiner* — Arif Ullah
(74) *Attorney, Agent, or Firm* — Merchant & Gould P.C.

(57) ABSTRACT

A ranking of customer service interactions sessions that may benefit from supervisor input is provided. The customer service interactions sessions involve a Customer Service Representative (CSR), engaged in a customer service interaction with a customer. First, customer service interaction sessions, at a contact center server, between the CSRs and the customers begin. Data streams from CSR computer(s) to customer computer(s) are sent. Other data streams from the customer computers are received. The data streams are analyzed by a supervisor recommendation engine. Based on the analysis, the supervisor recommendation engine generates a ranking of customer service interactions sessions that would benefit most from supervisor input.

18 Claims, 10 Drawing Sheets

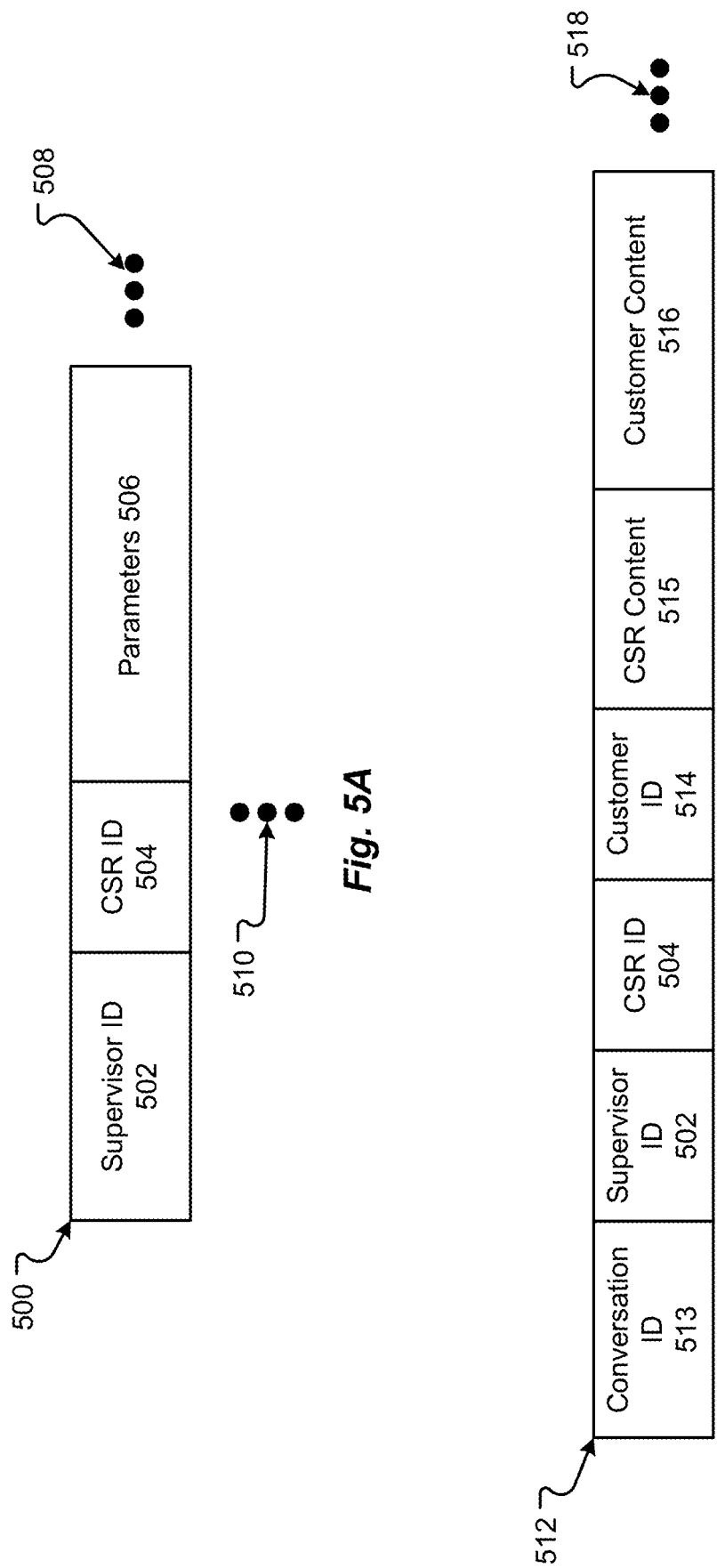

SYSTEMS AND METHODS SUPERVISOR WHISPER COACHING PRIORITY RECOMMENDATION ENGINE FOR CONTACT CENTERS

TECHNICAL FIELD

The present disclosure relates generally to communications applications executing between parties.

BACKGROUND

In a customer service interaction, for example a customer communicating with a representative of an organization, a customer service representative desires to provide helpful information or guidance. The customer service representative, thus, should be well-trained to understand the customer's needs and respond appropriately. While training before an interaction is valuable, training during an interaction is also valuable. Thus, learning from a supervisor, as the customer interactions occur, can improve the training to the customer service representative.

BRIEF DESCRIPTION OF THE FIGURES

The accompanying drawings, which are incorporated in and constitute a part of this disclosure, illustrate various embodiments of the present disclosure. In the drawings:

FIG. 5A shows a data structure stored, sent, received, and/or retrieved to provide training and/or direction to a customer service representative in accordance with aspects of the present disclosure;

FIG. 5B shows a data structure stored, sent, received, and/or retrieved to provide training and/or direction to a customer service representative in accordance with aspects of the present disclosure;

DETAILED DESCRIPTION

Overview

Figure 1:
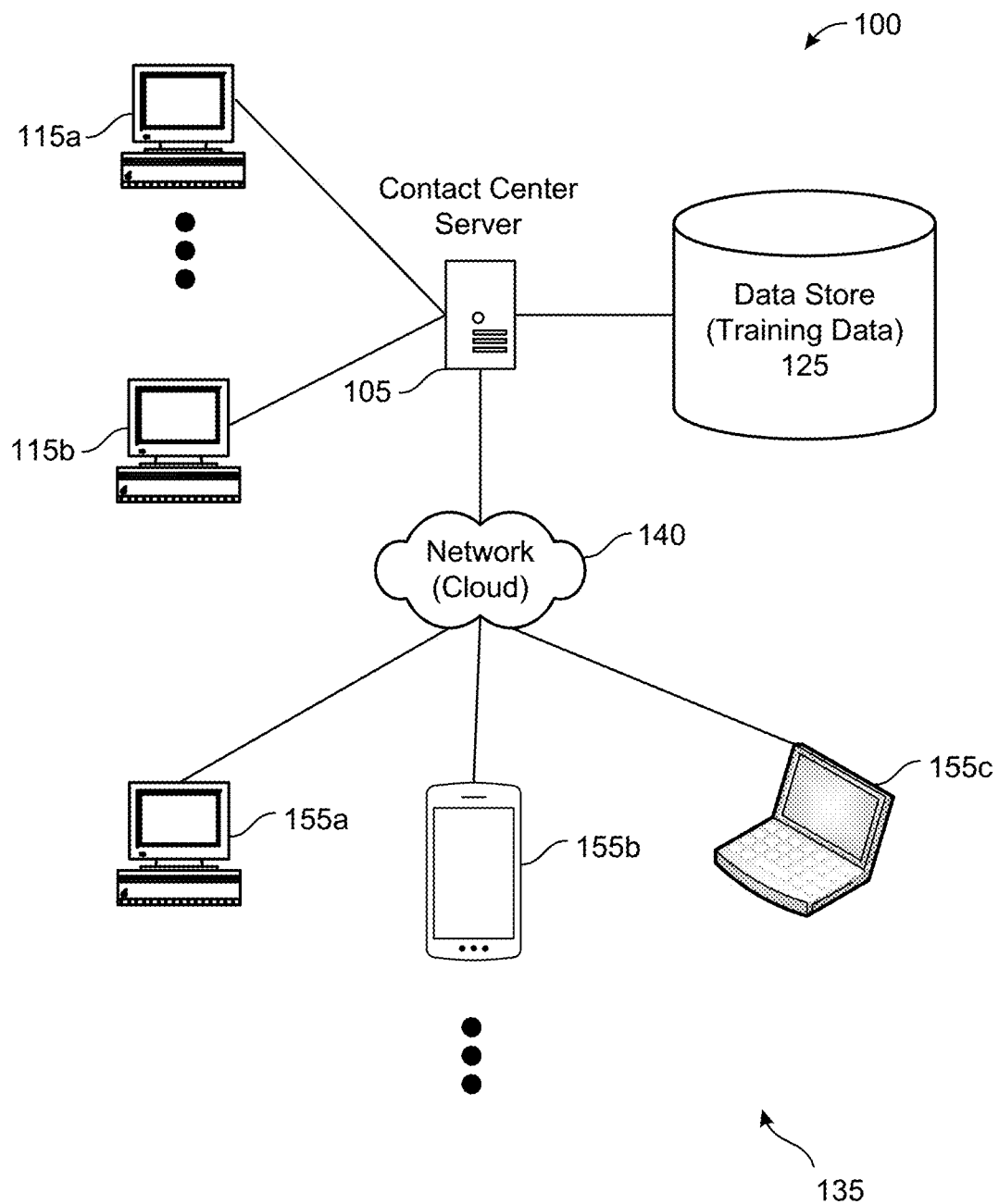
FIG. 1 shows an operating environment for training and directing a customer service representative in accordance with aspects of the present disclosure.

A ranking of customer service interactions sessions that may benefit from supervisor input is provided. The customer service interactions sessions involve a Customer Service Representative (CSR), engaged in a customer service interaction with a customer. First, customer service interaction sessions, at a contact center server, between the CSRs and the customers begin. Data streams from CSR computers to customer computers are sent. Other data streams from the customer computers are received. The data streams are analyzed by a supervisor recommendation engine. Based on the analysis, the supervisor recommendation engine generates a ranking of customer service interactions sessions that would benefit most from supervisor input. The ranking or prioritization for the customer service interaction sessions helps a supervisor determine which, if any, customer service interaction session may need his or her attention.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Supervisors can have a great impact on the success of customer care centers. However, supervisors are often hired in limited numbers, and their time is very valuable and expensive. In many customer care centers, a supervisor spends time on training new hires, supporting team members during difficult customer conversations, managing Customer Service Representative (CSR) growth and career progression, training CSRs on common etiquette and best practices for specific customer(s), supporting and/or guiding team members during exception handling and other difficult customer conversations, monitoring the CSR team's conversations in real time, and/or determining whether and when to intervene to maintain Service Level Agreements (SLAs) and healthy support operations.

Out of the above responsibilities, the most time consuming and challenging part of the job may be to monitor continuously and identify potential opportunities to help the CSRs in real time to maintain a healthy customer support operation. Calls or chats keep getting answered by the CSRs in the supervisor's teams, and determining which CSRs need the most help and at what point to jump-in is both difficult and important.

The aspects herein can replace the time-consuming, subjective, fatiguing, and manual approach of checking real-time team call statistics and performing ad-hoc barge-ins into real time conversations to determine which CSR to support next. Using a Machine Learning (ML) and Artificial Intelligence (AI), an automated recommendation engine can inform the supervisor which conversations may need attention. Thus, the aspects herein can reduce the supervisor time wasted on identifying coaching opportunities by automating this manual process and also can help make consistent judgments using the ML model.

A recommendation engine can support identification of interactions (e.g., calls, chats, emails, etc.) between customer service representatives and customers of an organization that would benefit the most from supervisor involvement, for example, from whisper coaching. The recommendation delivery can be in the form of a prioritized list of customer interactions, where the interactions at the top of the list may result in higher outcome returns than those interactions at the bottom.

A contact center environment may store voice recordings and chat transcripts with associated metadata (e.g., customer wait time, talk time, wrap-up reason codes, name and role of participants in a conversation, outcomes, etc.). The audio recordings can be converted to text, and various speakers annotated within the speech transcript. These pieces of data can help identify whether a supervisor was involved in whisper coaching the CSR. This data can help train the Machine Learning/Artificial Intelligent (ML/AI). During training, the recommendation engine ML model can learn from these transcripts and associated metadata to determine the customer journey context, the customer intent, how long the customer was on the call, how the supervisor whisper coached the CSR, how the representative handled the conversation pre & post coaching, what the outcome was, etc. The outcome can be part of the metadata captured by the application, or CSRs, or the recommendation engine may be able to determine the outcome from the transcript (including sentiment). The recommendation engine can learn when, during the journey, the supervisor barged-in, whether the barge-in helped steer the conversation in the right direction to the desirable outcome, etc. Once the recommendation engine is trained, the recommendation engine can monitor all conversations across multiple channels in real time and provide a recommendation of which interactions to barge-into to get the maximum value of the supervisor's time.

The aspects have various advantages. For example, the recommendation engine can help supervisors determine which customer CSR conversations to barge-into to get the maximum value of the supervisor's time and make the supervisor more effective. The recommendation engine can also apply information from cross channel applications. For example, the recommendation engine can use transcripts/recordings from one media channel, e.g., chat transcripts, to influence a recommendation in another channel, e.g., voice calls. Thus, the recommendation engine has a larger and more diverse collection of data to train the ML model.

FIG. 1 shows an operating environment 100 for training and deploying an autonomous program (e.g., a recommendation engine) in a customer contact system that interacts with a supervisor. The customer interaction, through video, chat, audio, or some other media, can include communications sent between CSR computers or computing system(s) 115a and customer computing system(s) 155. As shown in FIG. 1, operating environment 100 may comprise a contact center server 105 and a network 140. The contact center server 105 can receive data streams from the various devices 115a, 115b, and/or 155a-155c in the customer service interaction(s) and forward these data streams for provision on the users' computers 155, the CSR computer(s) 115a, and/or the supervisor computer 115b. It should be noted that the data stream may be provided in any media, video, voice, chat, etc., and provided to the computing systems 115, 155 or other devices. Thus, the computing systems 115, 155 can represent any device capable of providing the media type to the CSR, supervisor, and/or customer, for example, a computer, a telephone, a mobile device, a video display, etc. Further, the data streams may be processed by and passed through the contact center server 105.

The contact center server 105 may collect information about the data streams, associated with customer service interaction(s), sent from one or more of the CSR, supervisor, and/or user computing systems 115 and/or 155, in a group of devices 135, involved in the customer service interaction(s). This information can be stored in the data store 125 to train a recommendation engine, as described in more detail below. The contact center server 105 can provide information about the content in the data stream to train the recommendation engine. The information can be used, by the recommendation engine, to determine rank or prioritize customer service interactions for whisper coaching or other supervisor involvement. The recommendation engine may execute on the contact center server 105 and/or on the computing systems 115. The contact center server 105 may be located inside or outside network 140, for example, in a cloud environment. The contact center server 105 can be any hardware and/or software, as described in conjunction with FIG. 8.

The data stream(s) may be sent through one or more networks, represented by network 140. Network 140 may comprise, but is not limited to, an enterprise network and/or an outside network that may comprise an enterprise's communications backbone, the Internet, another Local Area Network (LAN), a Wide Area Network (WAN), or other network that may connect computers and related devices across departments and interconnect the CSR 115a, supervisor 115b, contact center server 105, and/or customer 155, facilitating the sharing of information in a customer service interaction. A network 140 may comprise a router, an access point, a user device (e.g., device 155), or other components or systems.

A plurality of end user devices 135 may be connected to one or more of the devices in the network 140, which allows for multiple customer service interactions to be conducted with the contact center server 105 contemporaneously. The network 140 can comprise any hardware device or configured node on a LAN, WAN, or other network that allows a device to connect through a communication standard. Network devices 140 can feature a processor, radio transmitters, and antennae, which facilitate connectivity between devices 155, 115, 105, and the network 140. The network devices 140 can be as described in conjunction with FIG. 8.

User devices 155 may comprise, but are not limited to, a cellular base station, a tablet device, a mobile device, a smartphone, a telephone, a remote control device, a set-top box, a digital video recorder, a cable modem, a personal computer, a network computer, a mainframe, a router, or other similar microcomputer-based device capable of accessing and using network 140. The user devices 155 can be any hardware and/or software, as described in conjunction with FIG. 8.

The data store 125 can be any type of data store, database, file system, and/or memory or storage. The data store 125 can store, manage, retrieve, etc. data associated with a customer service interaction. The data store 125 may be hardware and/or software associated with the contact center server 105 or associated with another separate system as described in conjunction with FIG. 8. Regardless, the data store 125 may include at least a portion of the data described in conjunction with FIGS. 5A, 5B, and/or 5C.

The elements described above, of operating environment 100 (e.g., contact center server 105, the computing systems 115, the data store 125, end user device(s) 155, etc.), may be practiced in hardware and/or in software (including firmware, resident software, micro-code, etc.) or in any other circuits or systems. The elements of the operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 8, the elements of operating environment 100 may be practiced in a computing device 800.

Consistent with aspects of the disclosure, the user device(s) 155 may be in communication over the network 140 to the contact center server 105 to send or receive a data stream associated with a customer service interaction. The contact center server 105 can receive the data streams from two or more devices 155, 115 during the customer service interaction(s). To determine which customer service interaction(s) may require supervisor involvement, the contact center server 105 can execute a recommendation engine that can provide the recommendation(s) to the supervisor. Hereinafter, provided in greater detail below, the processes of training the recommendation engine before and executing the recommendation engine during the customer service interaction(s) are further described.

Figure 2:
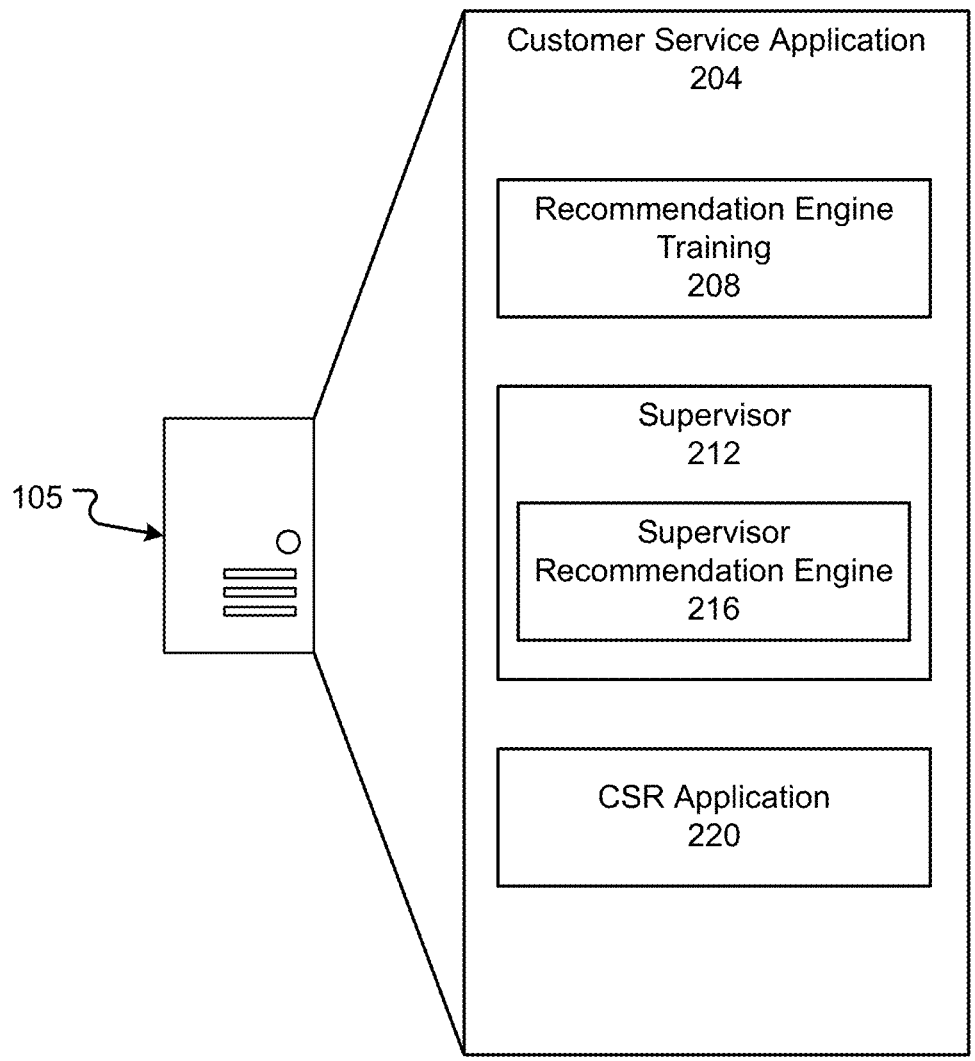
FIG. 2 shows an example of a customer service application in accordance with aspects of the present disclosure.

An exemplary contact center server 105 may be as shown in FIG. 2. The contact center server 105 can include at least one or more of a customer service application(s) 204. The customer service application(s) 204 can be any software and/or hardware that provides the customer service interaction. Thus, the customer service application(s) 204 can mix the various data streams provided from the two or more devices 155, 115 involved in the customer service interaction(s) and send the mixed signal(s) to the two or more devices 155, 115. Thus, the customer service application(s) 204 manages numerous inbound and outbound data streams. In at least some configurations, the customer service application(s) 204 can include or execute a recommendation engine that recommends which customer service interaction(s) may require or benefit from supervisor involvement. Thus, the customer service application(s) 204 can include one or more of, but is not limited to, a recommendation engine training application 208, a supervisor application 212, which can include the supervisor recommendation engine 216, and/or a CSR application 220.

The recommendation engine training application 208 can analyze the stored data streams, as possibly stored in data store 125, from two or more devices 155, 115 involved in the customer service interaction(s), when that customer service interaction(s) included whisper coaching or other supervisor involvement. This analysis can include characterizing the content of the data streams based on the characteristics of the exchange between the CSR, supervisor, and customer, characterizing the sentiment of the exchange, analyzing the metadata associated with the interaction, etc. Based on this analysis, the recommendation engine training application 208 can train a ML model on different types of whisper coaching or other supervisor involvement input, the content of the whisper coaching or other supervisor involvement input, the appropriate time to interject whisper coaching or other supervisor involvement input, etc. It should be noted that the recommendation engine training application 208 can analyze data streams of one of more various media types, e.g., chat, voice, video, etc., to train the supervisor recommendation engine 216. Hereinafter, the process of training the supervisor recommendation engine, with the recommendation engine training application 208, to determine a ranking or prioritization of customer service interaction(s) that may require or benefit from whisper coaching or other supervisor involvement input will be described in more detail.

The supervisor application 212 provides the supervisor, of the CSR, with the ability to receive the data streams in the customer service interaction(s) and accept input from the supervisor to the CSR during the customer service interaction(s). The supervisor application 212 can receive the data stream(s) in the customer service interaction(s) and may display or output the data stream as provided hereinafter. Further, the supervisor application 212 can also accept inputs from the supervisor, for example, whisper coaching inputs or other supervisor involvement. The inputs can be inserted into the data stream for the CSR computer 115a, but may exclude the customer computer 155 data stream. Thus, the supervisor inputs are provided only to the CSR. Part of the supervisor application 212 may be automated by the supervisor recommendation engine 216, which can review the incoming data stream(s) and provide a ranking or prioritization of the customer service interaction session(s), which allows the supervisor to quickly determine where best to provide supervisor involvement.

The supervisor recommendation engine 216 can analyze the data streams, from the two or more devices 155, 115 involved in the customer service interaction(s). This analysis can include characterizing the content of the present data streams based on the characteristics of the exchange between the CSR(s), supervisor(s), and customer(s), characterizing the sentiment of the exchange(s), analyzing the metadata associated with the interaction(s), etc. Based on this analysis, the supervisor recommendation engine 216 can apply the ML model to determine which interactions may be most positively influenced by supervisor input. The determination of which customer service interaction sessions may be most influenced by supervisor input can be provided to the supervisor computer 115b. This determination of which customer service interaction sessions may be most influenced by supervisor input may also be made across the various types of media streams, e.g., audio, chat, etc. The determination of which customer service interaction sessions may be most influenced by supervisor input may also be automated and can receive a selection of a customer service interaction(s) from a supervisor to barge in and provide input into a customer service interaction(s).

The CSR application 220 provides to the CSR computer 115a, and in some configurations, to the customer computer 155 the data stream in the customer service interaction(s) and receives any input from the CSR during the customer service interaction(s). The CSR application 220 can receive the data stream in the customer service interaction(s) and may display or output the data stream as provided hereinafter. Further, the CSR application 220 can also accept inputs from the CSR, for example, responses or messages to the customer. The inputs can be inserted into the data stream for the supervisor computer 115*b* and the customer computer 155 data stream. Any supervisor inputs can also be provided, by the CSR application 220, to the CSR.

Figure 3A:
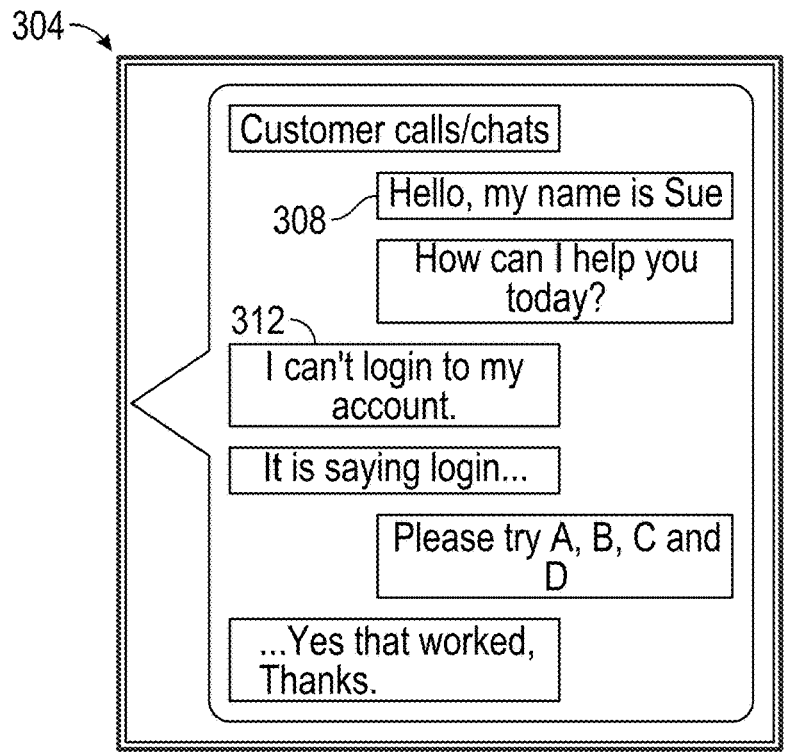
FIG. 3A shows example user interface content that may be shown on a customer display device in accordance with aspects of the present disclosure.

An example of a user interface 304, for a customer computer 155, provided during one type of customer service interaction(s), and the concomitant data associated therewith, may be as shown in FIG. 3A. The user interface display 304 can be a customer screen which represents at least a display or output of the user device(s) 155. In the display 304, the customer's view of the customer service interaction(s) may include text data or another presentation of the CSR inputs 308. Further, in display 304, the customer's view of the customer service interaction(s) may also include text data or another presentation of the customer's own inputs 312. It should be noted that the user interface 304 represents a customer service interaction(s) as a chat session. However, the customer service interaction(s) can be completed through other media types, e.g., audio, video, etc., and that the user interface 304 is just one example of a type of customer service interaction(s). Thus, the data within the user interface 304 can also represent video, audio, or other multimedia data. Further, it should be noted that the customer's view or perception of the customer service interaction(s) does not include any whisper coaching or other supervisor input that may occur on the CSR computer 115*a*, as noted in FIG. 3B. In other words, the supervisor input is silent or imperceptible with respect to the customer's side 304 of the customer service interaction(s).

Figure 3B:
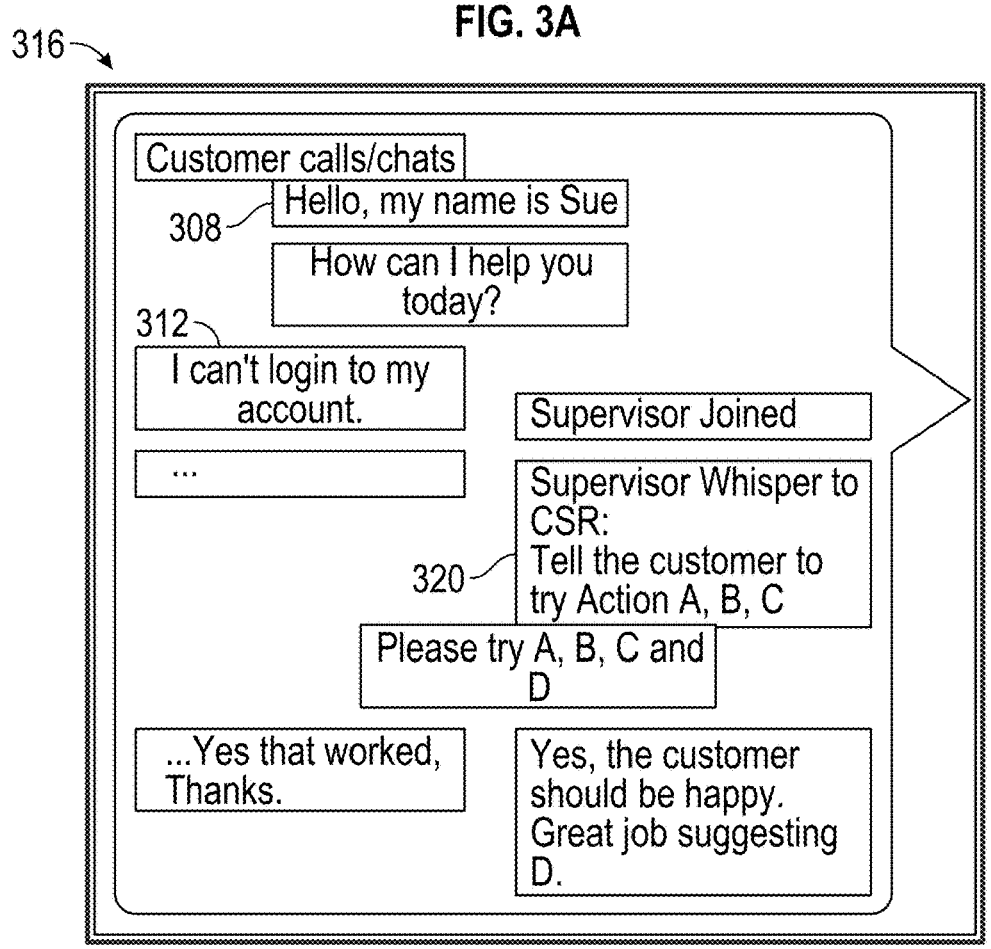
FIG. 3B shows example user interface content that may be shown on a customer service representative and/or supervisor device in accordance with aspects of the present disclosure.

An example of another user interface 316 may be as shown in FIG. 3B. The user interface 316 can be a user interface display on the CSR computer 115*a* and/or the supervisor computer 115*b*. The user interface display 316 can be a CSR and/or supervisor screen which represents at least a display or output of the computing systems 115. In the display 316, the CSR's and/or supervisor's view of the customer service interaction(s) may include text data or other presentation of the CSR inputs 308 and the customer's inputs 312. It should be noted that the user interface 304 represents a customer service interaction(s) as a chat session. However, the customer service interaction(s) can be completed through other media types, e.g., audio, video, etc., and that the user interface 316 is just a representation of a type of customer service interaction(s). Thus, the data within the user interface 316 can represent video, audio, or other multimedia data.

Further, the user interface 316 can also include the whisper coaching or other supervisor input 320. The supervisor inputs 320 can be input by the supervisor computer 115*b*. The supervisor input 320 can be shown on the CSR computing system 115*a* and/or the supervisor computing system 115*b*. Further, the transcript of the customer service interaction(s), as may be shown in FIG. 3B, may also be used by the recommendation engine training application 208 to train the supervisor recommendation engine 216. It should be noted that the supervisor inputs 320 shown on the display 316 are not shown or received on the customer's side 304 of the customer service interaction(s). Thus, the customer service application 204 prevents the supervisor inputs 320 from being sent to the customer 155.

Figure 3C:
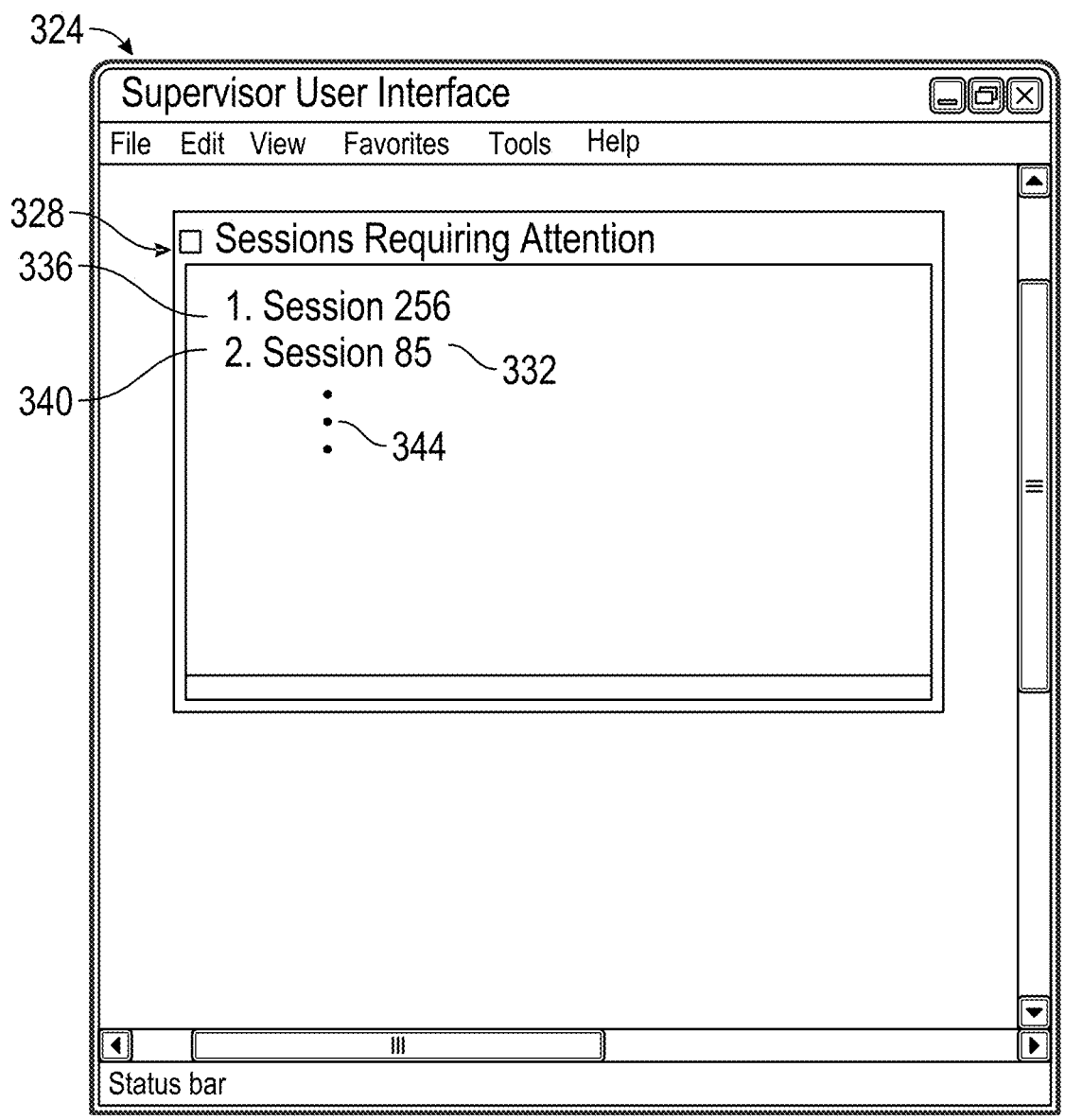
FIG. 3C shows example user interface content that may be shown on supervisor device in accordance with aspects of the present disclosure.

An example of another user interface 324 may be as shown in FIG. 3C. The user interface 324 can be a user interface display on the supervisor computer 115*b*. The user interface display 324 can be a supervisor screen which represents at least a display or output of the computing systems 115. In the display 324, the supervisor can view a report, in a display 328, that provides a determination of which customer service interaction may be most influenced by supervisor input. The display 328 can include a list 332 of two or more customer service interaction(s). The list 332 can rank or prioritize the customer service interaction(s). The top-most listed customer service interaction 336, "Session 256," may be most influenced by supervisor input, as determined by the recommendation engine. A second listed customer service interaction 340, "Session 85," may be the next most influenced customer service interaction by supervisor input, as determined by the recommendation engine. There may be more than two sessions ranked in display 328, as represented by ellipses 344.

Figure 4:
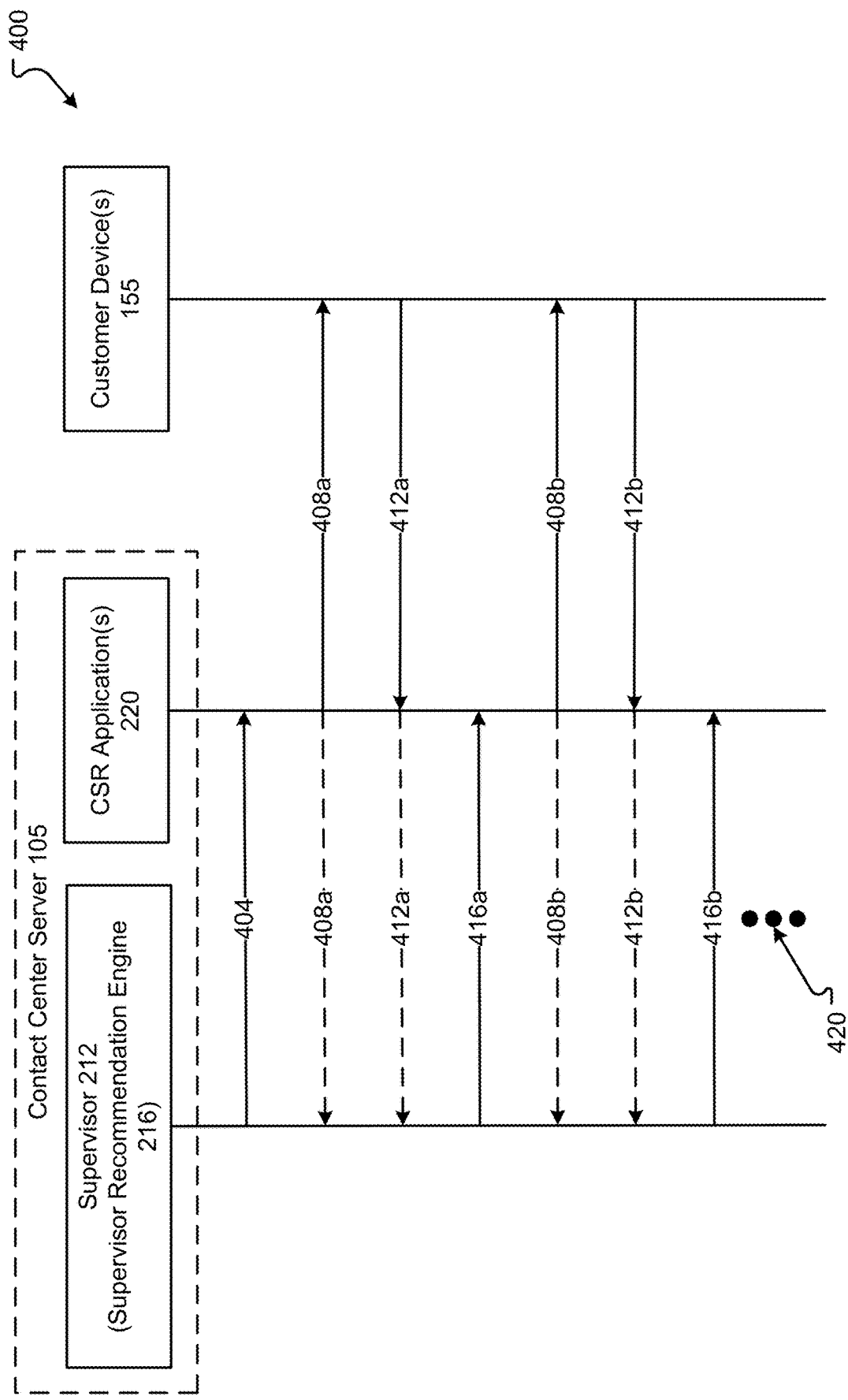
FIG. 4 shows a signaling diagram in accordance with aspects of the present disclosure.

FIG. 4 is a signaling diagram 400 that shows a least some of the communications between the user device(s) 155 and the contact center server 105. The signals may be sent in various stages to provide the customer service interaction(s) and to provide supervisor input, local to the contact center server 105. A supervisor application 212 can connect with and join with two or more CSR applications 220, in signal(s) 404. In response to signal(s) 404, interactions between the CSR application(s) 220 and any customer 155 may be monitored by the supervisor application 212.

Thereinafter, CSR application(s) 220 may send first communication(s) to customer(s), in signal(s) 408*a*. These signal(s) 408*a* may also be relayed to the supervisor application 212. User device(s) 155 can send reply(ies) or other input(s), in signal(s) 412*a*. These reply signal(s) 412*a* can also be relayed to the supervisor application 212. Based on the interactions in at least one or more of signals 408 and 412, a supervisor recommendation engine 216 can provide a recommendation as to which customer interactions would benefit most from supervisor input, for example, from whisper coaching. The supervisor may select one of the interactions from the recommendation to receive a view of the previously received signals and any subsequent signals.

Then, the supervisor can provide supervisor input, in signal 416*a*, to the CSR application 220. The signal 416*a* stays in the contact center server 105 and is not relayed to the customer device 155. Another exchange of messages may occur in signals 408*b*, 412*b*, and/or 416*b*. These interactions may repeat more or fewer times than that shown in FIG. 4, as represented by ellipses 420.

FIG. 5A is a data structure 500 that may be an example of the data included in signal 404. The data structure 500 can include one or more of, but is not limited to, a supervisor Identifier (ID) 502, a CSR ID 504, and/or parameters 506. The data structure 500 can include more or fewer fields than those shown in FIG. 5A, as represented by ellipses 508. Further, each CSR computer 115*a*, managed or supervised by the supervisor computer 115*b*, involved in a customer service interaction(s), can receive a data structure 500. Thus, there may be more data structures provided in the environment 100 than that shown in FIG. 5A, as represented by ellipses 510, based on the number of CSR computers 115*a* operating with the contact center server 105 and the supervisor computer 115*b*.

The supervisor ID 502 can represent any type of identifier that uniquely identifies the supervisor application 212 and/or supervisor computer 115*b*. Thus, the supervisor Identifier (ID) 502 can be a numeric ID, an alphanumeric ID, an Internet Protocol (IP) address, a Media Access Control (MAC) address, or some other address or ID used by the contact center server 105 to the send signal 404 to the CSR computer 115*a* and/or CSR application 220 and to recognize which supervisor computer 115b or supervisor application 212 is associated with the data stream.

The CSR ID 504 can represent any type of identifier that uniquely identifies the CSR computer 115a and/or CSR application 220 in the customer service interaction(s). Thus, the CSR ID 504 can be a numeric ID, an alphanumeric ID, an IP address, a MAC address, a phone number, or some other address or ID used by the contact center server 105 to identify the CSR computer 115a and/or CSR application 220 for conducting the customer service interaction(s) associated with the data stream from the CSR computer 115a and/or CSR application 220 to the customer computer 155 from the contact center server 105.

The parameters 506 can include any data, associated with the customer service interaction(s), sent between the supervisor application 212 and/or supervisor computer 115b and the CSR computer 115a and/or CSR application 220. Thus, the parameters 506 can include settings, media types, types of customer service interaction(s)s allowed, how to display or provide content, supervisor input, or whisper coaching, connection ports, etc. that represents how and what is being shared between the supervisor application 212 and/or supervisor computer 115b and the CSR computer 115a and/or CSR application 220. The parameters 506 may be classified by the supervisor application 212 and/or the customer service application 204 based on the requirements of the customer service interaction(s).

Further, the parameters 506 can indicate how a supervisor will interact with the CSR computer 115a and/or CSR application 220. For example, the parameters 506 can indicate if the CSR computer 115a and/or CSR application 220 can receive whisper coaching, whether the supervisor application 212 will provide all or a some of the whisper coaching or other supervisor input, the format or output characteristics of the whisper coaching, etc. Thus, the parameters 506 can indicate the conditions and environment for the supervisor input and/or whisper coaching.

FIG. 5B shows another data structure 512 that may be an example of the data included in signal 408 and/or signal 412. The data structure 512 can include one or more of, but is not limited to, a conversation ID 513, the supervisor ID 502, the CSR ID 504, a customer ID 514, CSR content 515, and/or customer content 516. The data structure 512 can include more or fewer fields than those shown in FIG. 5B, as represented by ellipses 518. Further, each device 155, 115, involved in a customer service interaction(s), can send several data structures 512 during a customer service interaction(s), and thus, there may be more data structures 512 provided than that shown in FIG. 5B, as represented by ellipses 520. The supervisor ID 502 and the CSR ID 504 may be as previously described with data structure 500, and thus, will not be explained further. It should be noted that the data structure 512 may represent data as provided in a chat session(s) or other text-based customer service interaction(s). However, the data with data structure 512 may have similar or the same types of data (although in a different format or provided differently) with other media types, e.g., audio or video, that may also be represented by data structure 512.

The conversation ID 513 can represent any type of identifier that uniquely identifies the customer service interaction(s). Thus, the conversation ID 513 can be a numeric ID, an alphanumeric ID, any type of other identifier (e.g., IP address, MAC address, phone number, etc.,) associated with the customer service interaction(s), or some other address or ID used by the contact center server 105 to identify the customer service interaction(s). The conversation ID 513 can identify the customer service interaction(s) and the associated data streams during the customer service interaction(s) and after the data stream content and metadata is stored in data store 125. Using the conversation ID 513, the contact center server 105 can properly receive and send the data streams, in the customer service interaction(s), between the customer computer 155, the supervisor application 212 and/or supervisor computer 115b, and/or the CSR computer 115a and/or CSR application 220.

The customer ID 514 can represent any type of identifier that uniquely identifies the customer or customer computer 155 in the customer service interaction(s). Thus, the customer ID 514 can be a numeric ID, an alphanumeric ID, an IP address, a MAC address, a name, a username, a phone number, or some other address or ID used by the contact center server 105 to identify the customer or customer computer 155. The customer ID 514 can identify the customer for conducting the customer service interaction(s) associated with the data stream from the customer computer 155 sent to the contact center server 105 and vice versa.

The data structure 512, if representing signal 408, can include CSR content 515 generated from the CSR computer 115a and/or CSR application 220 and provided to the user device(s) 155 involved in the customer service interaction(s). The CSR content 515 can include any type of content (e.g., chat inputs, voice responses or input, video input, multimedia input, etc.) sent from the CSR to the customer. Thus, the CSR content 515 can include the audio, video, text, multimedia, etc. being shared between the CSR computer 115a and/or CSR application 220 and the customer computer 155, in data signal 408. The CSR content 515 may be generated by the CSR with the CSR computer 115a and/or CSR application 220. Further, the CSR content 515 can also be shared with the supervisor application 212 and/or supervisor computer 115b, including the supervisor recommendation engine 216.

The data structure 512, if representing signal 412, can include customer content 516 received from the user device(s) 155 involved in the customer service interaction(s). Thus, the customer content 516 can also include the audio, video, text, multimedia, etc. being shared between the the customer computer 155 and the CSR computer 115a and/or CSR application 220, in data signal 412. The customer content 516 may be generated by the customer computer 155 for the CSR computer 115a and/or CSR application 220. Further, the customer content 516 can also be shared with the supervisor application 212 and/or supervisor computer 115b, including the supervisor recommendation engine 216.

Figure 5C:
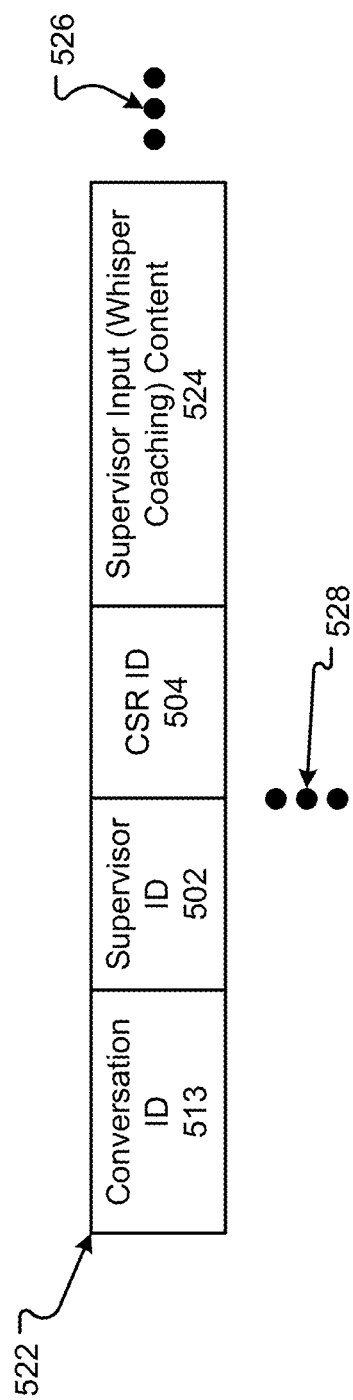
FIG. 5C shows a data structure stored, sent, received, and/or retrieved to provide training and/or direction to a customer service representative in accordance with aspects of the present disclosure.

FIG. 5C is another data structure 522 that may be an example of the supervisor input data, for example, whisper coaching, included in signal 416. The data structure 522 can include one or more of, but is not limited to, the conversation ID 513, the supervisor ID 502, the CSR ID 504, and/or, supervisor input content 524. The data structure 522 can include more or fewer fields than those shown in FIG. 5C, as represented by ellipses 526. Further, each customer service interaction(s), supervised by the supervisor application 212 and/or supervisor computer 115b, including the supervisor recommendation engine 216, can send a data structure 522, and thus, there may be more data structures provided in environment 100 by the contact center server 105 than that shown in FIG. 5C, as represented by ellipses 528. The conversation ID 513, the supervisor ID 502, and the CSR ID 504 may be as previously described with data structure 500 and/or data structure 512, and thus, will not be explained further.

The supervisor input content 524 can include content generated from the supervisor application 212 (as input by a human supervisor) and provided to the CSR computer 115a and/or CSR application 220 involved in the customer service interaction(s). The supervisor input content 524 can include any type of content (e.g., chat inputs, voice inputs, video inputs, multimedia inputs, etc.) sent from the supervisor application 212 to the CSR computer 115a and/or CSR application 220. Thus, the supervisor input content 524 can include the audio, video, text, multimedia, etc. being shared between the supervisor application 212 and the CSR computer 115a and/or CSR application 220, in data signal 416. The supervisor input content 524 may be generated from supervisor input into the supervisor application 212. Further, the supervisor input content 524 can also be shared with the supervisor application 212 and/or supervisor computer 115b, for display on the supervisor computer 115b, so the human supervisor can monitor the customer service interaction(s).

Figure 6:
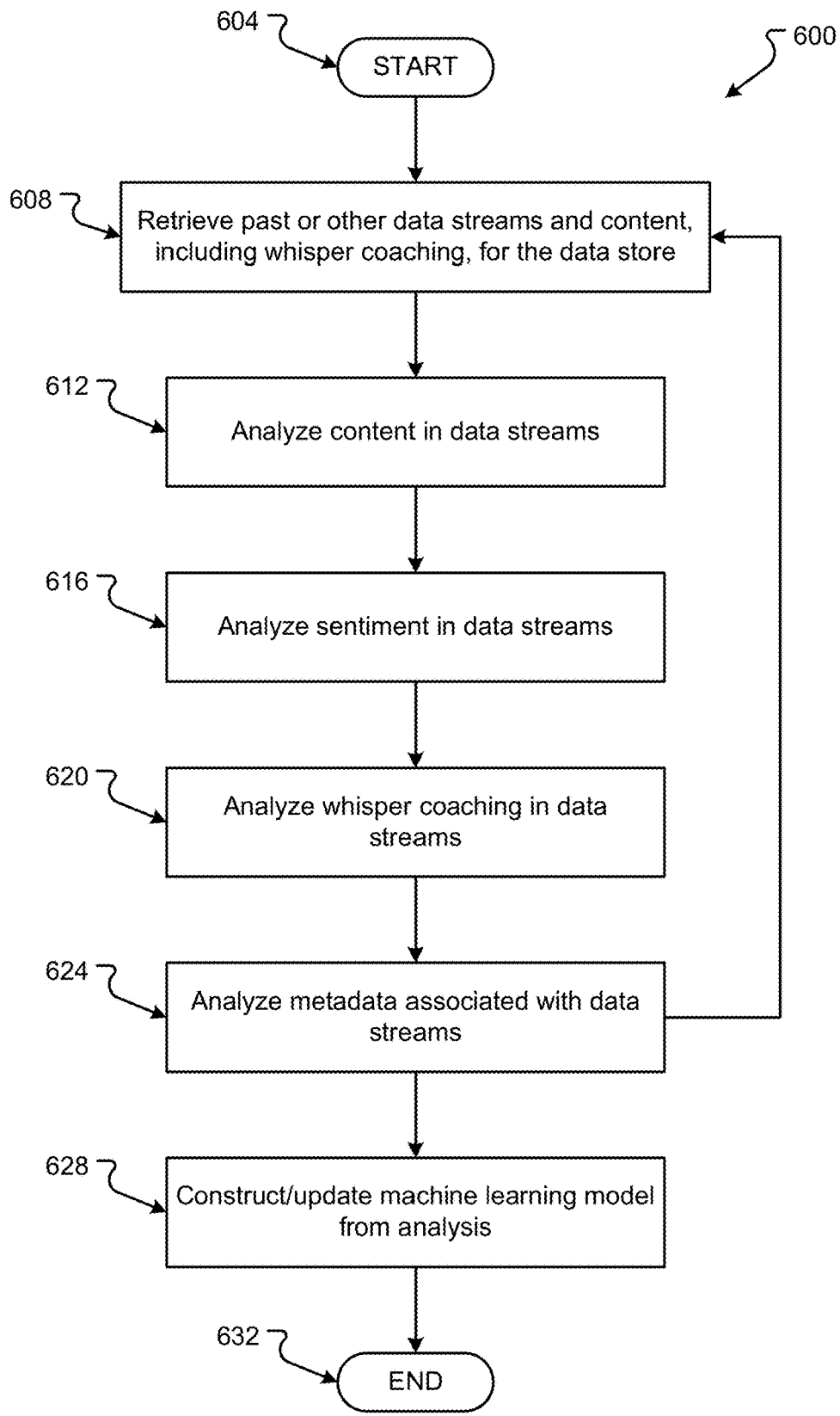
FIG. 6 shows a method, conducted by the customer service application, to train a recommendation engine in accordance with aspects of the present disclosure.

An embodiment of a method 600, as conducted by the recommendation engine training application 208, for training the supervisor recommendation engine 216, may be as shown in FIG. 6. A general order for the stages of the method 600 is shown in FIG. 6. Generally, the method 600 starts with a start operation 604 and ends with an end operation 632. The method 600 can include more or fewer stages or can arrange the order of the stages differently than those shown in FIG. 6. The method 600 can be executed as a set of computer-executable instructions executed by a computer system and encoded or stored on a computer readable medium. Further, the method 600 can be performed by gates or circuits associated with a processor, an Application Specific Integrated Circuit (ASIC), a Field Programmable Gate Array (FPGA), a System-On-Chip (SOC), or other hardware device. Hereinafter, the method 600 shall be explained with reference to the systems, components, devices, modules, software, data structures, data characteristic representations, signaling diagrams, methods, etc. described in conjunction with FIGS. 1-5C and 7-8.

The recommendation engine training application 208, of the customer service application 204, executing on the contact center server 105, can retrieve or receive data streams associated with one or more customer service interaction(s), in stage 608. The recommendation engine training application 208 can receive data streams, e.g. data structures 512, 522, from customer service interaction(s) occurring contemporaneously with the training. Further, the recommendation engine training application 208 can retrieve data streams, e.g. data structures 512, 522, from the data store 125, of past customer service interaction(s)s that were recorded and stored for the training. These received or retrieved data streams can be of different media types, e.g., audio, video, chat, email, social media, etc. While the media type effects how the interaction is conducted, the differing media types are often similar for how supervisor input, e.g., whisper coaching, is provided, and therefore, the differing media type information is useful in training the supervisor recommendation engine 216.

The data streams analyzed by the recommendation engine training application 208 can include any of the data signals 408-416, as may be represented by data structures 500, 512, and/or 522. Thus, the data can include the content of the customer service interaction(s) and, in at least some configurations, the metadata associated with the data streams, for example, the times of receipt or transmission, the context or subject of the customer service interaction(s), information about the organization associated with the contact center, the locations of the customer, CSR, or other participants, the names or ratings for the CSR and/or supervisor (e.g., how experienced the parties were), or other information. In other words, the recommendation engine training application 208 retrieves or receives any information needed to properly analyze the information to construct the machine learning model for the supervisor recommendation engine 216. It should be noted that the training may begin with a training data set, but the training of the supervisor recommendation engine 216 can be ongoing as new data can update the machine learning model to make the supervisor recommendation engine 216 more effective.

The recommendation engine training application 208 may then conduct an analysis of the data streams and/or the metadata associated with the data streams, in stages 612-624. Thus, the recommendation engine training application 208 can analyze the CSR content 515, the customer content 516, and/or the supervisor input 524 (e.g., the whisper coaching content) associated with the customer service interaction(s), in stage 612. The words used and the association both temporally and contextually between the messages from the CSR, supervisor, and customer, can be evaluated and linked. Outcomes for the conversation may be determined or analyzed. Other content analysis may be completed. In this way, the recommendation engine training application 208 can determine when and what supervisor input was effective and in which customer interaction(s) that input was effective The recommendation engine training application 208 can then analyze the sentiment of the CSR content 515, the customer content 516, and/or the supervisor input 524 associated with the customer service interaction(s), in stage 616. The sentiment analyzes words used that indicate feelings or intent. For example, words such as "great," "awesome," "best" can indicate satisfaction, while words such as "terrible," "unacceptable," "wrong," can indicate dissatisfaction. These sentiment words are identified in the content and the association of these sentiments, both temporally and contextually, between the CSR, supervisor, and customer, content can be evaluated and linked. The sentiment may be linked to outcomes for the conversation. Other sentiment analysis may be completed. In this way, the recommendation engine training application 208 can determine when and in what customer service interaction(s) the supervisor input is or was beneficial.

The recommendation engine training application 208 may then conduct an analysis of the supervisor input associated with the data streams, in stage 620. Thus, the recommendation engine training application 208 can analyze the supervisor input 524 associated with the customer service interaction(s). The words used and the association both temporally and contextually, between the CSR, supervisor, and customer interactions, can be evaluated and linked. Outcomes and sentiment for the conversation may be determined or analyzed to determine the effectiveness and timing of the supervisor input. Other supervisor input analysis may be completed. In this way, the recommendation engine training application 208 can determine when and in which customer service interaction(s) the supervisor input is beneficial to the outcome of the customer service interaction(s).

The recommendation engine training application 208 may also analyze the metadata associated with the CSR content 515, the customer content 516, and/or the supervisor input 524 associated with the customer service interaction(s), in stage 624. The metadata represents other data associated with the data streams. For example, the metadata can include the media type, the date or time when the customer interaction occurred, information about the supervisor or CSR (e.g., the rating of the CSR, the years of experience, customer feedback about the CSR or supervisor, etc.), or other information. This metadata is identified, and the association of the metadata with the data streams is evaluated. Then, the recommendation engine training application 208 can determine how the metadata can affect the importance or how analysis of one data stream may be more influential than other analysis of other data streams. In this way, the recommendation engine training application 208 can determine the better or best customer service interaction(s) into which to interject supervisor input and/or the best timing of supervisor input based on the metadata associated with the customer service interaction(s).

Thereinafter, the recommendation engine training application 208 can construct or update a machine learning model, in stage 628. Based on the analysis above and/or other analysis, the recommendation engine training application 208 can create/change the machine learning model or algorithms and data used by the supervisor recommendation engine 216 when and in which customer service interaction(s) the supervisor input is beneficial to the outcome of the customer service interaction(s). The machine learning model can be constructed or updated by one or more methods as understood by one skilled in the art. However, this machine learning model evaluates the benefits of supervisor input, from a supervisor as interjected into the customer service interaction(s). Thus, the interaction between the customer and CSR is analyzed to determine the effectiveness and timing of the content the supervisor input, which is not directly provided to the customer. So the machine learning model deals with a unique data set type and environment.

Figure 7:
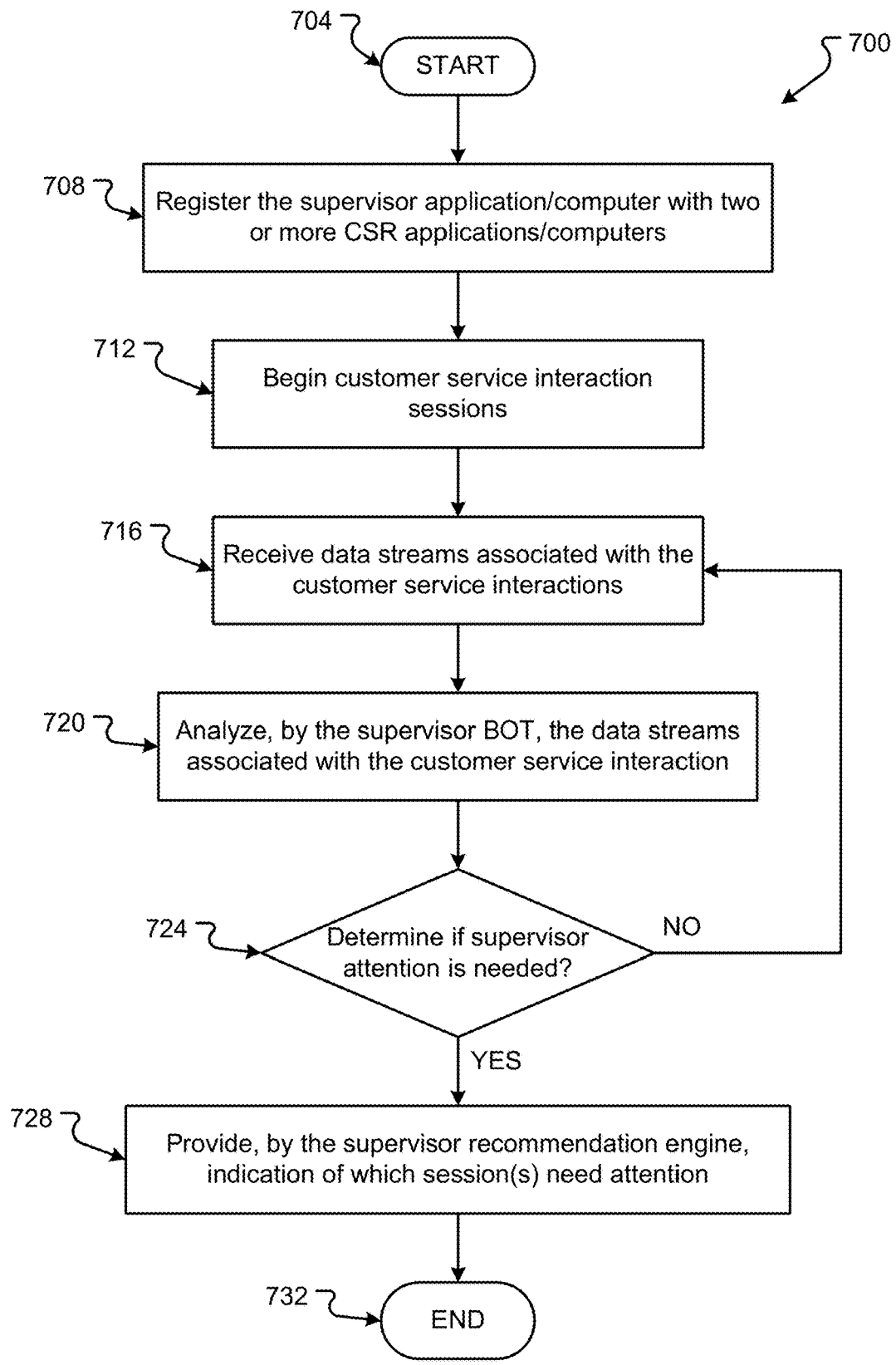
FIG. 7 shows a method, conducted by the customer service application, to execute a recommendation engine in accordance with aspects of the present disclosure.

A method 700, as conducted by the supervisor recommendation engine, for automatically providing a recommendation(s) about where to apply supervisor input in customer service interaction(s) may be as shown in FIG. 7. A general order for the stages of the method 700 is shown in FIG. 7. Generally, the method 700 starts with a start operation 704 and ends with an end operation 732. The method 700 can include more or fewer stages or can arrange the order of the stages differently than those shown in FIG. 7. The method 700 can be executed as a set of computer-executable instructions executed by a computer system and encoded or stored on a computer readable medium. Further, the method 700 can be performed by gates or circuits associated with a processor, an ASIC, a FPGA, a SOC, or other hardware device. Hereinafter, the method 700 shall be explained with reference to the systems, components, devices, modules, software, data structures, data characteristic representations, signaling diagrams, methods, etc. described in conjunction with FIGS. 1-6 and 8.

The supervisor application 212 (and/or the supervisor recommendation engine 216) registers with the CSR application 220 (and/or the CSR computer 115a), in stage 708. The supervisor application 212 and/or the supervisor recommendation engine 216 can send signal 404, including data structure 500. The registration ensures that the customer service application 204 includes the supervisor application 212 and/or the supervisor recommendation engine 216 in any data streams communicated between the CSR application 220 and/or CSR computer 115a and the customer computer 155. Further, the registration allows the supervisor application 212 and/or the supervisor recommendation engine 216 to provide supervisor input to the CSR application 220 and/or CSR computer 115a without the inputs being viewed or received by the customer 155.

At stage 712, the CSR begins a customer service interaction(s) with a customer 155. Thus, the CSR application 220 and/or CSR computer 115a can send the first signal 408, including some or all of the data in data structure 512, to the customer device 155. The communication may be similar to communication 308, as shown in FIG. 3B. This initial communication can also be provided to the supervisor application 212 and/or the supervisor recommendation engine 216. Thereinafter, the customer may input a response or request into the customer device 155. The customer input may be sent, by the customer device 155, as signal 412, including some or all of the data in data structure 512. This signal 412 may be received by the contact center server 105, in stage 716. The data in data structure 512 may then be presented to the CSR application 220 and/or CSR computer 115a and/or the supervisor application 212 and/or the supervisor recommendation engine 216. Then, the exchange of signals 408 and 412 may repeat as necessary during the customer service interaction(s).

During the exchange of the signals 408, 412 in the customer service interaction(s), the supervisor recommendation engine 216 can analyze the data streams for two or more of the customer service interactions, in stage 720. The supervisor recommendation engine 216 can review content, sentiment, metadata, etc. associated with the data streams 408, 412. This review may be similar to what was conducted in method 600 but is completed in real time. Based on the review, the supervisor recommendation engine 216 may determine which, if any, customer service interaction(s) may be influenced by supervisor input, in stage 724. This determination may be an estimation of sentiment or a comparison to past customer service interaction(s) (as stored in data store 125) that required and/or benefited from supervisor input. Regardless of the method of determining if supervisor input would be valuable, if supervisor input is to be made, the method 700 proceeds "YES" to stage 728. However, if supervisor input is not to be made, the method 700 proceeds "NO" back to stage 716 where more data is received in the data streams and analyzed again.

In stage 728, using the machine learning model algorithm, trained in method 600, the supervisor recommendation engine 216 can and generate a list of the customer service interactions occurring currently and being monitored by the supervisor. The supervisor recommendation engine 216 may then determine, from the list of customer service interaction(s), which interacting may be most influenced by supervisor input.

The supervisor recommendation engine 216 may then rank those customer service interaction(s) from the customer service interaction that would benefit the most to the customer service interaction that would benefit the least. The rankings may be entered into a user interface 328, which may be generated by the supervisor recommendation engine 216, and output to the supervisor application 212. The user interface 328 may then be displayed on the display 324 of the supervisor computer 115b. By selecting one of the entries 336, 340, etc. in the display 328, the supervisor can select which of the customer service interactions to which to provide supervisor input.

When a selection is received, the supervisor application 212 can connect the supervisor to the selected customer service interaction. For example, the selections 336, 340, etc. may each be associated with a conversation ID 513. Thus, the supervisor application 212 can determine the customer service interaction based on the association. By connecting the supervisor to the customer service interaction, the supervisor application 212 allows the supervisor to provide input into the customer service interaction. To provide the supervisor input, the supervisor application 212 may convert the supervisor input into a different media type, e.g., convert text to speech. The supervisor input may be as included in data structure 522. This supervisor input may then be presented on the CSR computer 115*a* and the supervisor computer 115*b*, as described in conjunction with FIG. 3B or provided in another form or format.

Figure 8:
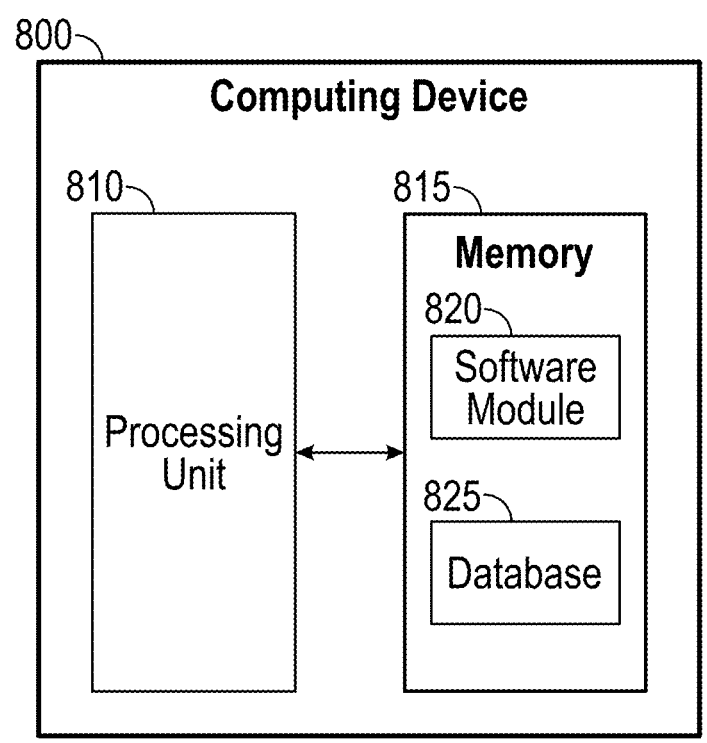
FIG. 8 shows a block diagram of a computer or computing device for conducting or executing the methods and processes for providing a recommendation in accordance with aspects of the present disclosure.

FIG. 8 shows computing device 800. As shown in FIG. 8, computing device 800 may include a processing unit 810 and a memory unit 815. Memory unit 815 may include a software module 820 and a database 825. While executing on processing unit 810, software module 820 may perform, for example, processes for recommending interactions to apply supervisor input, including for example, any one or more of the stages from method 600 or method 700 described above with respect to FIG. 6 and FIG. 7. Computing device 800, for example, may provide an operating environment for elements of operating environment 100 including, but not limited to, contact center server 105, CSR computer 115*a*, supervisor computer 115*b*, and user device(s) 155. Elements of operating environment 100 (e.g., contact center server 105, CSR computer 115*a*, supervisor computer 115*b*, and user device(s) 155) may operate in other environments and are not limited to computing device 800.

Computing device 800 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart television-like device, a network storage device, a network relay device, or other similar microcomputer-based device. Computing device 800 may comprise any computer operating environment, such as hand-held devices, multiprocessor systems, microprocessor-based or programmable sender electronic devices, minicomputers, mainframe computers, and the like. Computing device 800 may also be practiced in distributed computing environments where tasks are performed by remote processing devices. The aforementioned systems and devices are examples and computing device 800 may comprise other systems or devices.

Accordingly, aspects of the present disclosure comprise a method comprising: beginning two or more customer service interaction sessions, at a contact center server, between two or more Customer Service Representatives (CSRs) and two or more customers; providing two or more data stream from two or more CSR computers to two or more customer computers; receiving two or more data streams from the customer computers; analyzing, by a supervisor recommendation engine, the two or more data streams from the CSR computers and the two or more data streams from the customer computers; and based on the analysis, the supervisor recommendation engine generating a ranking of the two or more customer service interaction sessions based on which customer service interaction session would benefit most from supervisor input.

Any of the one or more above aspects, wherein the supervisor input is whisper coaching.

Any of the one or more above aspects, wherein the whisper coaching is not provided to the customer computer.

Any of the one or more above aspects, wherein the supervisor recommendation engine comprises a machine learning model that generates the ranking.

Any of the one or more above aspects, wherein the machine learning model is developed from past customer service interactions that include supervisor input.

Any of the one or more above aspects, wherein the past customer service interactions include two or more media types.

Any of the one or more above aspects, wherein the two or more media types comprise one or more of an audio media type, a video media type, a chat session media type, and/or a social media exchange media type.

Any of the one or more above aspects, wherein the machine learning model is created by a recommendation engine training application, wherein the recommendation engine training application: retrieves past data streams from past customer service interactions; analyzes supervisor input in the past data streams to determine which customer service interaction sessions benefited from the supervisor input; and based on the analysis, constructs the machine learning model.

Any of the one or more above aspects, wherein the recommendation engine train application further analyzes content in the past data streams, sentiment in the past data streams, and/or metadata associated with the past data streams.

Any of the one or more above aspects, wherein the ranking is provided in a user interface to a supervisor, and wherein the supervisor can select a selection associated with a first customer service interaction session to interject supervisor input into the first customer service interaction session.

Aspects of the present disclosure further comprise a non-transitory computer readable medium having stored thereon instructions, which when executed by a processor, cause the processor to conduct a method comprising: beginning two or more customer service interaction sessions, at a contact center server, between two or more Customer Service Representatives (CSRs) and two or more customers; providing two or more data stream from two or more CSR computers to two or more customer computers; receiving two or more data streams from the customer computers; analyzing, by a supervisor recommendation engine, the two or more data streams from the CSR computers and the two or more data streams from the customer computers; and based on the analysis, the supervisor recommendation engine generating a ranking of the two or more customer service interaction sessions based on which customer service interaction session would benefit most from supervisor input.

Any of the one or more above aspects, wherein the supervisor input is whisper coaching.

Any of the one or more above aspects, wherein the ranking is provided in a user interface to a supervisor, and wherein the supervisor can select a selection associated with a first customer service interaction session to interject supervisor input into the first customer service interaction session.

Any of the one or more above aspects, wherein the machine learning model is developed from past customer service interactions that include supervisor input, and wherein the past customer service interactions include two or more media types.

Any of the one or more above aspects, wherein the two or more media types comprise one or more of an audio media type, a video media type, a chat session media type, and/or a social media exchange media type.

Aspects of the present disclosure further comprise a system comprising: a memory storage; a processing unit coupled to the memory storage, wherein the processing unit to: execute a customer service application to conduct a customer service interaction between a customer and the system, wherein the customer service application comprising: a supervisor recommendation engine, wherein the supervisor recommendation engine: receiving two or more data streams from the customer computers; analyzing, by a supervisor recommendation engine, the two or more data streams from the CSR computers and the two or more data streams from the customer computers; and based on the analysis, the supervisor recommendation engine generating a ranking of the two or more customer service interaction sessions based on which customer service interaction session would benefit most from supervisor input.

Any of the one or more above aspects, wherein the supervisor input instructs a Customer Service Representative (CSR) on how to respond to the customer.

Any of the one or more above aspects, wherein the supervisor recommendation engine analyzes one or more of content in the first and/or second data streams, sentiment in the first and/or second data streams, and/or metadata associated with the in the first and/or second data streams.

Any of the one or more above aspects, wherein the customer service application further comprises a recommendation engine training application, wherein the recommendation engine training application: retrieves past data streams from past customer service interactions; analyzes supervisor input in the past data streams to determine which customer service interaction sessions benefited from the supervisor input; and based on the analysis, constructs the machine learning model.

Any of the one or more above aspects, wherein the past data streams comprise two or more media types.

Any of the one or more above aspects combined with any of the other one or more above aspects.

Any of the one or more above aspects as described herein.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a Random Access Memory (RAM), a Read-Only Memory (ROM), an Erasable Programmable Read-Only Memory (EPROM or Flash memory), an optical fiber, and a portable Compact Disc Read-Only Memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' steps or stages may be modified in any manner, including by reordering steps or stages and/or inserting or deleting steps or stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a SOC where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 800 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:
1. A method comprising:
   establishing two or more customer service interaction sessions, at a contact center server, between two or more Customer Service Representatives (CSRs) and two or more customers;

analyzing, by a supervisor recommendation engine, the two or more customer service interaction sessions between two or more CSR computers and the two or more customers; and based on the analysis, the supervisor recommendation engine generating a ranking of the two or more customer service interaction sessions based on which customer service interaction session would benefit most from supervisor input, wherein generating the ranking of the two or more customer service interaction sessions based on which customer service interaction session would benefit most from the supervisor input comprises:

determining characteristics of the two or more customer service interaction sessions between the CSR computers and the two or more customers, determining metadata associated with the two or more customer service interaction sessions between the CSR computers and the two or more customers, and determining the ranking of the two or more customer service interaction sessions from a machine learning model based on the characteristics of the two or more customer service interaction sessions and the metadata associated with the customer service interaction sessions, wherein the machine learning model provides an effectiveness and a timing of the supervisor input for the two or more customer service interaction sessions based on supervisor inputs associated with past customer service interaction sessions, sentiments associated with the supervisor inputs for past customer service interaction sessions, the characteristics associated with the past customer service interaction sessions, and the metadata associated with the past customer service interaction sessions;

training the machine learning model, wherein training the machine learning model is comprises:

retrieving past data streams from the past customer service interaction sessions;

analyzing the supervisor inputs in the past data streams to determine which of the past customer service interaction sessions benefitted from the supervisor input; and based on the analysis, constructing the machine learning model.

2. The method of claim 1, wherein the supervisor input is whisper coaching.

3. The method of claim 2, wherein the whisper coaching is not provided to the two or more customers.

4. The method of claim 1, wherein the past customer service interaction sessions comprise two or more media types.

5. The method of claim 4, wherein the two or more media types comprise one or more of an audio media type, a video media type, a chat session media type, and/or a social media exchange media type.

6. The method of claim 1, further comprising: analyzing content in the past data streams, sentiment in the past data streams, and/or metadata associated with the past data streams.

7. The method of claim 1, wherein the ranking is provided in a user interface to a supervisor, and wherein the supervisor can select a selection associated with a first customer service interaction session to interject supervisor input into the first customer service interaction session.

8. A non-transitory computer readable medium having stored thereon instructions, which when executed by a processor, cause the processor to conduct a method comprising:

establishing two or more customer service interaction sessions, at a contact center server, between two or more Customer Service Representatives (CSRs) and two or more customers;

analyzing, by a supervisor recommendation engine, the two or more data streams from two or more CSR computers and the two or more data streams from the two or more customers; and based on the analysis, the supervisor recommendation engine generating a ranking of the two or more customer service interaction sessions based on which customer service interaction session would benefit most from supervisor input, wherein generating the ranking of the two or more customer service interaction sessions based on which customer service interaction session would benefit most from the supervisor input comprises:

determining characteristics of the two or more customer service interaction sessions between the CSR computers and the two or more customers, determining metadata associated with the two or more customer service interaction sessions between the CSR computers and the two or more customers, and determining the ranking of the two or more customer service interaction sessions from a machine learning model based on the characteristics of the two or more customer service interaction sessions and the metadata associated with the customer service interaction sessions, wherein the machine learning model provides an effectiveness and a timing of the supervisor input for the two or more customer service interaction sessions based on supervisor inputs associated with past customer service interaction sessions, sentiments associated with the supervisor inputs for past customer service interaction sessions, the characteristics associated with the past customer service interaction sessions, and the metadata associated with the past customer service interaction sessions;

training the machine learning model, wherein training the machine learning model is comprises:

retrieving past data streams from the past customer service interaction sessions:

analyzing the supervisor inputs in the past data streams to determine which of the past customer service interaction sessions benefitted from the supervisor input; and based on the analysis, constructing the machine learning model.

9. The non-transitory computer readable medium of claim 8, wherein the supervisor input is whisper coaching.

10. The non-transitory computer readable medium of claim 9, wherein the ranking is provided in a user interface to a supervisor, and wherein the supervisor can select a selection associated with a first customer service interaction session to interject supervisor input into the first customer service interaction session.

11. The non-transitory computer readable medium of claim 10, wherein the past customer service comprises two or more media types.

12. The non-transitory computer readable medium of claim 11, wherein the two or more media types comprise one or more of an audio media type, a video media type, a chat session media type, and/or a social media exchange media type.

13. A system comprising:
a memory storage; a processing unit coupled to the memory storage, wherein the processing unit is operative to:
execute two or more customer service applications to conduct two or more customer service interaction sessions between two or more customers and two or more Customer Service Representatives (CSRs)
analyze the two or more customer service interaction sessions between the two or more CSR computers and the two or more customers; and
generate, based on the analysis, a ranking of the two or more customer service interaction sessions based on which customer service interaction session would benefit most from supervisor input, wherein the processing unit being operative to generate the ranking of the two or more customer service interaction sessions based on which customer service interaction session would benefit most from the supervisor input comprises the processing unit being operative to:
determine characteristics of the two or more customer service interaction sessions between the CSR computers and the two or more customers,
determine metadata associated with the two or more customer service interaction sessions between the CSR computers and the two or more customers,
determine the ranking of the two or more customer service interaction sessions from a machine learning model based on the characteristics of the two or more customer service interaction sessions and the metadata associated with the customer service interaction sessions, wherein the machine learning model provides an effectiveness and a timing of the supervisor input for the two or more customer service interaction sessions based on supervisor inputs associated with past customer service interaction sessions, sentiments associated with the supervisor inputs for past customer service interaction sessions, the characteristics associated with the past customer service interaction sessions, and the metadata associated with the past customer service interaction sessions;
training the machine learning model, wherein training the machine learning model is comprises:
retrieving past data streams from the past customer service interaction sessions;
analyzing the supervisor inputs in the past data streams to determine which of the past customer service interaction sessions benefitted from the supervisor input; and
based on the analysis, constructing the machine learning model.

14. The system of claim 13, wherein the supervisor input instructs a Customer Service Representative (CSR) on how to respond to at least one of the two or more customers.

15. The system of claim 13, wherein the past data streams comprise two or more media types.

16. The system of claim 15, wherein the two or more media types comprise one or more of an audio media type, a video media type, a chat session media type, and/or a social media exchange media type.

17. The system of claim 13, wherein the supervisor input is whisper coaching.

18. The system of claim 17, wherein the whisper coaching is not provided to the two or more customers.

\* \* \* \* \*